United States Patent [19]

Foster

[11] 4,061,297
[45] Dec. 6, 1977

[54] APPROACH RANGE MONITOR

[75] Inventor: George B. Foster, Worthington, Ohio

[73] Assignee: AirData Inc., Worthington, Ohio

[21] Appl. No.: 584,407

[22] Filed: June 6, 1975

[51] Int. Cl.$^2$ ............................................. G05D 1/12
[52] U.S. Cl. ................................... 244/184; 244/189; 343/107; 364/451
[58] Field of Search ...................... 235/150.22, 150.26, 235/150.27; 244/184, 185, 188, 189; 318/581; 343/7 ED, 107, 108 R, 112 R

[56] References Cited

U.S. PATENT DOCUMENTS

| | | | |
|---|---|---|---|
| 2,322,225 | 6/1943 | Crane et al. ........................... | 244/188 |
| 3,345,017 | 10/1967 | Olah ..................................... | 244/185 |
| 3,504,165 | 3/1970 | Richardson et al. ....... | 235/150.27 X |
| 3,750,942 | 8/1973 | Bean ................................. | 235/150.27 |
| 3,796,867 | 3/1974 | Abnett et al. .................... | 235/150.27 |

Primary Examiner—Stephen G. Kunin
Attorney, Agent, or Firm—Cennamo Kremblas & Foster

[57] ABSTRACT

An area navigation system capable of operating during an ILS approach to provide the pilot range and bearing with respect to the outer and middle markers for a front course approach, and with respect to the final approach fix and the end of the runway for a back course approach. The system operates by automatically connecting the # 2 NAV receiver to the RNAV during ILS operation while the ILS localizer converter is connected to the # 1 NAV receiver. At the same time the RNAV is disconnected from the left side indicator so this may be used for the localizer.

5 Claims, 4 Drawing Figures

APPROACH RANGE MONITOR

INTRODUCTION AND BACKGROUND

This invention relates to area navigation systems, and more particularly to an area navigation system capable of providing range and bearing data in conjunction with ILS and Localizer approaches. The invention is described in the particular context of the area navigation systems described and claimed in Assignee's Abnett et al U.S. Pat. No. 3,796,867 entitled, "ANGLE MODE AREA NAVIGATION COMPUTER", in Assignee's Bean U.S. Pat. No. 3,750,942 entitled, "DISTANCE MODE AREA NAVIGATION COMPUTER", and in Assignee's copending Foster et al U.S. Patent application Ser. No. 476,513, filed June 5, 1974 and entitled "AREA NAVIGATION SYSTEM." The disclosures of these patents and application are incorporated herein to extent pertinent.

An extended description of the concepts of area navigation and its many advantages is set forth in the Abnett et al and Bean patents, and the reader is referred to these patents for more information. Briefly, however, there exists a network of navigation aids called VORTAC's which provide radio information from which range and bearing information may be derived. In area navigation, the VORTAC range and bearing data are used in conjunction with arbitrarily selected range and bearing from the VORTAC to a so-called waypoint. Because the location of a waypoint is arbitrary within the range of a particular VORTAC, the pilot is no longer constrained to fly along or near the established airways (defined with respect to a series of VORTAC stations).

In broad terms, area navigation systems such as those of the Bean and Abnett et al patents operate by solving a vector triangle defined by the aircraft, the VORTAC, and the waypoint, given the selected waypoint address vector and the measured aircraft to VORTAC vector.

In the Abnett et al patent, there is shown an area navigation system in which the aircraft to waypoint vector is used to generate a display of range from the aircraft to the waypoint, and a track angle deviation display. The latter is based on the difference between the actual aircraft to waypoint bearing (the angle component of the aircraft to waypoint vector) and the bearing at which it is desired that the aircraft intercept the waypoint, i.e. the selected track angle. The angle display is advantageously accomplished by means of a "left-right" needle included in the course deviation indicator (Or C D I) of the standard VORTAC navigation systems. In the Bean patents, track deviation is displayed on a left-right meter as distance from the selected track.

The RNAV equipment is, of course, not the only available navigation aid. In fact, instrumentation normally includes one, and usually two VOR receives and a DME (distance measuring equipment) receiver along with associated display equipment to process VORTAC data and for I L S (instrument landing system) approaches available at commercial airports and at many general aviation facilities. An RNAV system coupled with the above utilizes the same receivers and display equipment.

Moveover, there is a substantial degree of standardization. For example, the display equipment for the #1 or primary NAV receiver is on the left side and the display for the #2 NAV receiver is on the right. The left side display is used for I L S operation and for RNAV when present. Thus, in heretofore available installations during an instrument approach, RNAV data is not available.

This is undesirable for several reasons. For example, the front (normally used) course at an I L S equipped airport includes a pair of "Markers" giving distance fixes to an approaching aircraft. These are the LOM, or locator outer marker, normally located five miles from the end of the runway and the middle marker, located one-half mile from the runway. These markers actuate alarms in the aircraft to signal passage of the points in the approach. However, the I L S equipment makes no provision for determining distance to the marker. Such information could be extremely useful in assisting the pilot in adjusting the aircraft configuration (speed, flaps, etc.) and runway approach angle. Further, where ground control radar is available, one of its principal functions is to provide the pilot with distance to the L O M. Availability of RNAV during an ILS approach would be a most desirable substitute for ground control radar or for the so called terminal DME facility which are not commonly available at general aviation airports.

BRIEF DESCRIPTION OF INVENTION

The above noted availability of RNAV information during an ILS landing is accomplished by providing an Approach Range Monitor mode of operation. This utilizes the #1 VOR receiver as the ILS data input source and the #2 VOR receiver for RNAV data input. (For normal, i.e., enroute, operations, RNAV data is provided by the #1 NAV receiver.) Further, when switching the RNAV from the #1 VOR receiver to the #2 receiver, provision is made automatically to retune the D M E receiver, thereby assuring that the D M E frequency corresponds to the proper VOR signal source.

As to the display, for the en route mode of RNAV operation, the existing "left side" course display indicator (C D I) or other display device such as the horizontal situation indicator (H S I) is connected to the RNAV computer to provide the "left - right" needle display. When the system operates in the approach range monitor mode, the left side C D I or H S I is driven by the so-called localizer converter in the I L S associated with the #1 NAV receiver.

Since the left - right steering information provided by the RNAV is redundant under these conditions, it is not displayed at all. Instead, "distance to waypoint" and "bearing to waypoint" displays permanently associated with the RNAV provide distance and bearing to two waypoints, advantageously selected at the outer and middle markers for a front course ILS approach.

Even for an I L S back course approach where outer and middle marker beacons are ordinarily not present, concurrent use of the RNAV range monitor mode is a particular advantage. In that case, a waypoint is placed at the final approach fix, defined on navigation charts as the intersection of the back course localizer path with a selected radial from a nearby VORTAC or a bearing from an ADF station. The RNAV then provides distance and bearing information comparable to that provided with respect to the outer marker on a front course approach. A second waypoint may be placed at the end of the runway to provide data comparable to that provided relative to the middle marker on the front course. Thus, while the RNAV may not be as accurate as the front course I L S, the range monitor mode of operation augments and materially improves the back course approach by providing synthetic markers.

It is therefore among the objects of this invention:

To provide an improved RNAV system capable of use during ILS approaches;

To provide such an RNAV system having an approach range monitor mode of operation which makes range and bearing information available relative to the outer and middle markers for a front course ILS approach;

To provide such an RNAV system which makes range and bearing information available relative to the final approach fix and the end of the runway for a back course ILS approach;

To provide an RNAV system which normally receives input information from the # 1 VOR receiver, but which is switched to the # 2 VOR receiver for range monitor operation; and To provide such an RNAV system in which the DME receiver is automatically tuned to a frequency corresponding to the # 1 VOR receiver during the en route mode of RNAV operation and to the frequency corresponding to the # 2 VOR receiver during approach range monitor operation.

The exact nature of the invention, as well as other objects and advantages thereof, will be apparent from the following detailed description and the accompanying drawing, in which.

DETAILED DESCRIPTION OF INVENTION

In the following detailed description, the novel features are disclosed in the context of the system shown in the Abnett et al patent and the Foster et al application. It should be recognized, however, that the range monitor mode of operation herein disclosed is directly and advantageously applied in the system of the Bean patent, as well as in area navigation systems of any other type. Thus, while the disclosure is in a specific context, it should not be regarded as so limited.

Figure 1:
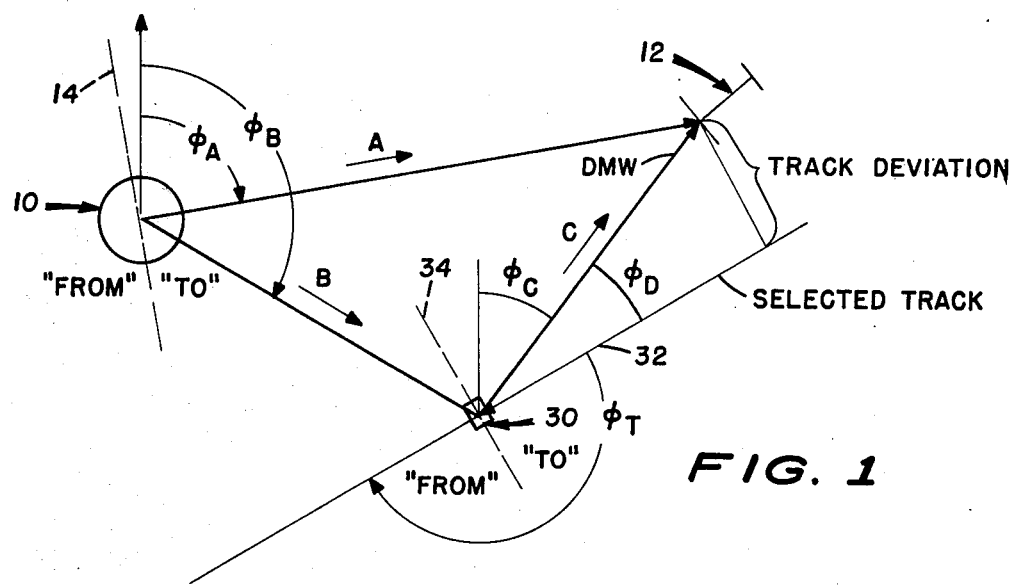
FIG. 1 is a vector diagram useful in understanding the basic concepts of area navigation.

Turning first to FIG. 1, there is shown a vector diagram useful in the better understanding of the concepts of this invention. Shown is a VORTAC station 10 and an aircraft 12 located in an arbitrary position with respect to station 10. The aircraft position is defined in terms of a vector $\overline{A}$ having a magnitude A and an azimuth or bearing (with respect to North) of Q A. In conventional VOR navigation the magnitude A and the angle Q A are computed, and utilized to locate the aircraft relative to the VORTAC and relative to a selected course, i.e., a desired bearing toward the VORTAC. A "left-right" course deviation indicator (CDI) provides a measure of how many degrees to the left or right the aircraft bearing must be changed to intercept the desired course. A "to-from" indicator is normally provided as a part of the course deviation indicator. The "to" indication is given if the course deviation angle (i.e., desired bearing minus actual bearing) is within plus or minus 90°. The "from" indication is given in the course deviation angle is more than 90° or less than −90°. The dashed line 14 in FIG. 1 represents the "to-from" boundary assuming vector $\overline{A}$ in fact to be the selected course.

For area navigation the pilot establishes a succession of arbitrary landmarks, such as that denoted 30, and commonly called waypoints. Waypoint 30 has a known bearing $\phi_B$ and a range B with respect to a VORTAC such as 10 in its vicinity, thereby defining the vector $\overline{B}$ from the VORTAC to the waypoint. The triangle defined by vector $\overline{A}$ and $\overline{B}$ includes a third side $\overline{C}$ defining an azimuth angle $\phi_C$ and a range C of the aircraft with respect to the waypoint. Since the components of the vector $\overline{A}$ are determined by the incoming VORTAC data, and since the components of the vector B may be determined for a selected waypoint from a suitable navigational chart, the $\overline{C}$ vector can be determined by the vector subtraction $\overline{A} - \overline{B}$ once this is done, the navigation using an area navigation system may treat the vector $\overline{C}$ in precisely the same manner as the navigator using standard VORTAC techniques would treat the vector $\overline{A}$.

In particular, a selected track 32, analogous to the "selected course" mentioned above, may be defined as the desired bearing of the aircraft as it approaches the waypoint, and a track deviation angle $\phi_D$ computed as the difference between the actual bearing of the aircraft from the waypoint (180° + $\phi_C$) and its desired bearing $\phi_T$ on the selected track, i.e., $\phi_D = 180° + \phi_T - \phi_C$. The computed range C is displayed as a distance to the waypoint on an appropriate indicator as the bearing $\phi_D$ and displayed on the conventional CDI. As in conventional VOR navigation a "to-from" indicator is used to show whether the aircraft is more or less 90° off the selected track. (See line 34 in FIG. 1.)

Figure 2:
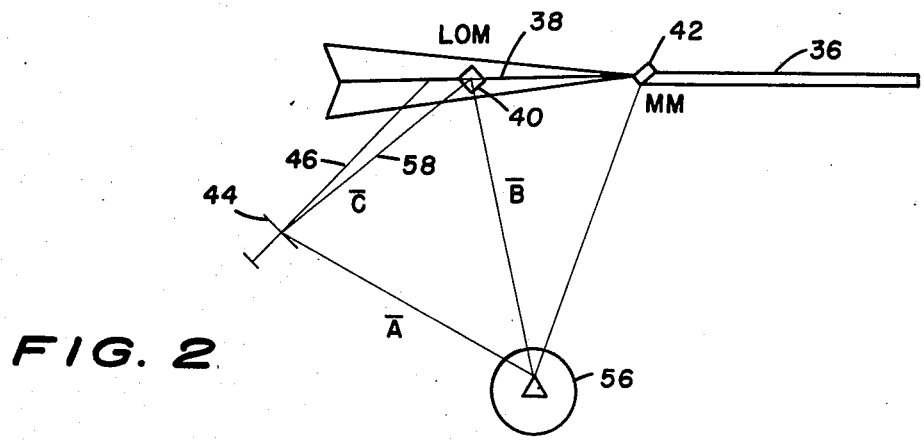
FIG. 2 is a diagram showing a front course ILS approach.

FIG. 2 shows the significant features of a front course ILS approach. A runway 36 is approached along a course 38 defined by a directional signal transmitted from the airport. The signal is processed in the aircraft to generate a localizer i.e. left and right of the runway signals used by the pilot to orient the aircraft for landing.

Additionally, there are a pair of non directional beacons 40 and 42, defining respectively, the outer marker at a distance of five miles and the middle marker at a distance of one-half mile. An aircraft 44 is shown approaching the inbound course 38 along a heading line 46.

For normal ILS operation, the localizer provides left-right steering information. When the aircraft passes beacons 40 and 42, appropriate signals are given, but until that time, the pilot does not actually know his distance from the beacons.

Figure 3:
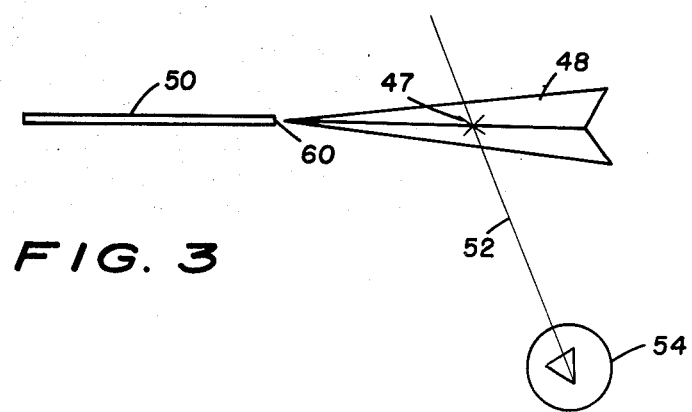
FIG. 3 is a diagram showing a back course ILS approach.

FIG. 3 shows a back course approach. Here the course 48 approaching runway 50 is defined by a localizer as before, but there are no beacons. Instead, the final approach fix 47 is defined by the intersection of course 48 and a radial 52 from a nearby VORTAC 54.

By combining the RNAV principals described in connection with FIG. 1 with those described in connection with FIGS. 2 and 3, substantial advantages are obtained. In FIG. 2, the RNAV system is used to establish waypoints at markers 40 and 42 with reference to a VORTAC 56. For the configuration shown, outer marker 40 is used as the waypoint, and the magnitude and angle of the $\overline{C}$ vector along line 58 gives bearing and range to the waypoint.

When the outer marker is passed, middle marker 42 is used as the waypoint and similar range and bearing information is provided.

In FIG. 3, the FAF 47 is used as one waypoint and the end of the runway at 60 serves as the second waypoint.

Figure 4:
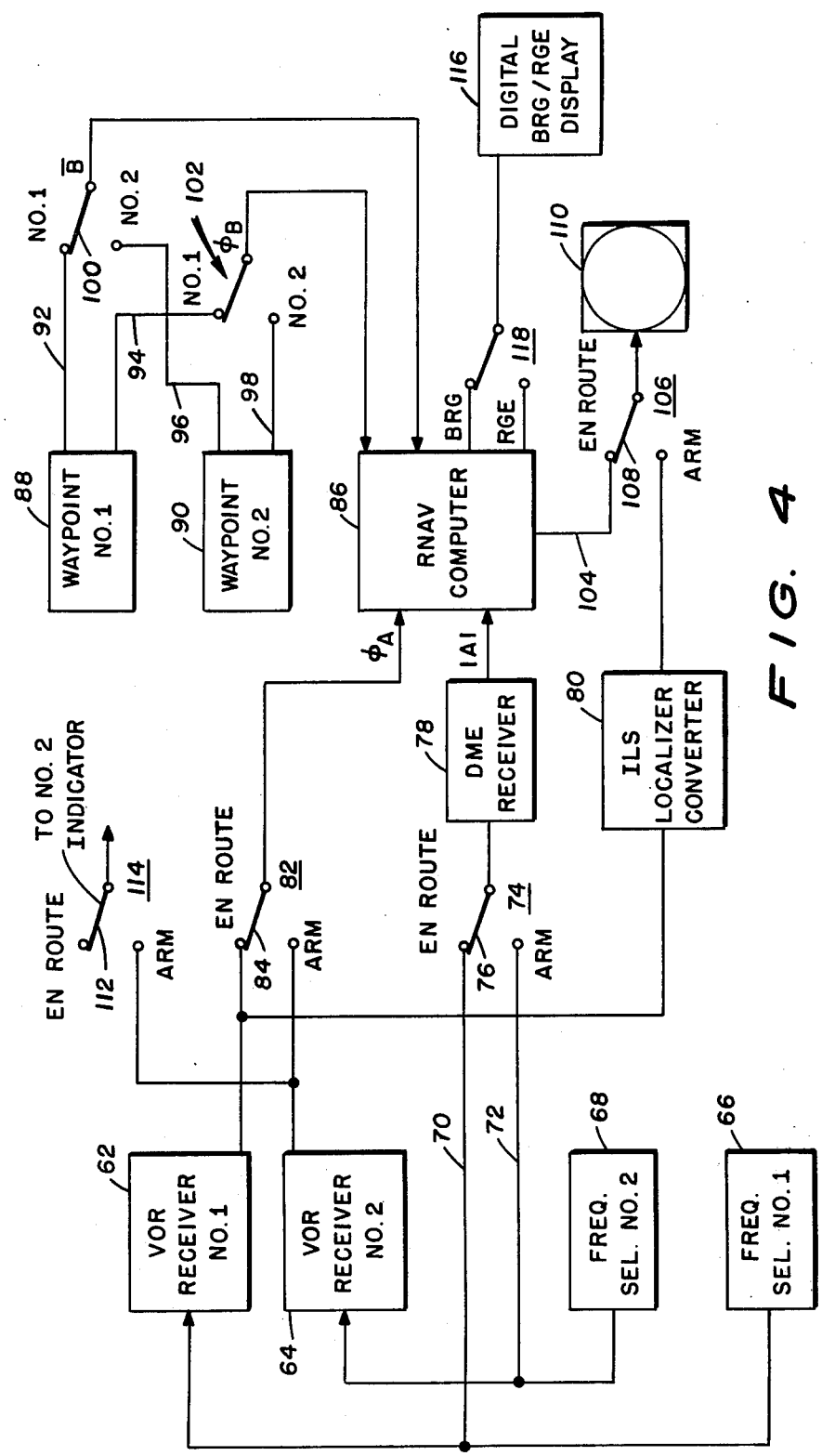
FIG. 4 is a block diagram showing the incorporation of the present invention in an RNAV system.

FIG. 4 is a schematic diagram showing the incorporation of the approach range monitor mode of operation into an RNAV system. Again, it should be understood that the present invention is useful in conjunction with any type of RNAV, but for purposes of the description, readers are referred to the aforementioned Abnett at and Bean patents and to the Foster et al. patents application for details.

In FIG. 4, there are shown a pair of VOR receivers 62 and 64. These are associated with a respective pair of frequency selectors 66 and 68 which may be part of the VOR receivers or separate, but from which output signals are made available over respective leads 70 and 72 to the fixed contacts of a two-position switch 74. These contacts are respectively designated "en route" and ARM. The VOR receivers and frequency selectors may for purposes of this invention, be completely conventional, and serve in the usual way to receive and process VOR data, i.e., the angle component $\phi_A$ of the $\overline{A}$ vector (See FIG. 1.) Also, as explained below, in the range monitor mode of operation receiver 62 receives, and provides initial processing of the ILS localizer signal.

The moving contact 76 of switch 74 is coupled to a frequency selection input of a DME receiver 78. This again is a conventional unit which processes the distance information, i.e. the magnitude of the $\overline{A}$ vector from the VORTAC to the aircraft.

The outputs of the two VOR receivers 62 and 64 serve several functions. Specifically, the output of VOR receiver 62 is coupled to an ILS localizer converter 80 of any conventional or desired kind by which the various ILS command signals are generated. In addition, the VOR receivers 62 and 64 are connected respectively to the "en route" and "ARM" contacts of a second two position switch 82, the moving contact 84 of which provides the angle signal $\phi_A$ to the RNAV computer 86. As explained in detail in the Abnett and Bean patents, and in the Foster application, DME receiver 78 provides the $\overline{A}$ vector magnitude signal $|A|$ to the RNAV computer. A pair of waypoint address selectors 88 and 90 provide the angle and range components of the VORTAC to waypoint vector $\overline{B}$. Use of two separate waypoint address units allows presetting the addresses for successive waypoints and transfer from the first to the second when the aircraft passes the first.

In the waypoint units described in the Abnett and Bean patents etc, the waypoint address components are provided digitally in parallel format. Thus the output signal paths from the waypoint units are shown only schematically. Waypoint unit 88 provides the magnitude component on a signal path 92 while the angle component is provided on a signal path 94. Correspondingly, the magnitude and angle outputs for waypoint unit 90 are provided on signal paths 96 and 98. The selected waypoint data is coupled to RNAV computer 86 by a pair ganged switches 100 and 102, again shown schematically.

As explained in detail in the Abnett and Bean patents etc, the RNAV computer advantageously provides output data in the form of left-right steering signals either in the form of distance deviation from the desired track (the Bean Patent) or in angular deviation (as in the Abnett patent.) Such data is coupled on a lead 104 to the "en route" position of a switch 106. As shown, the "ARM" position of switch 106 is coupled to the output of localizer converter 80. The moving contact 108 of switch 106 is coupled to a left-right needle indicator 110 which may be a conventional course deviation indicator (CDI) or a horizontal situation indicator (HSI,) whichever happens to be installed. In any event, indicator 110 is the left side or primary indicator and is used conventionally as the ILS steering display during ILS operation. A second indicator (not shown) may also be provided. This would be connected by means of moving contact 112 and the "ARM" contact of a switch 114 to the output of VOR receiver 64 for use during back course approaches as explained below.

In addition to the left-right display output, RNAV computer 86 provides a digital display of bearing and distance to the waypoint, i.e. the angle and magnitude components of the $\overline{C}$ vector. These are displayed digitally on a display unit 116. A switch, shown schematically at 118 allows selection between the two displays.

Operation of the system described above is as follows:

When flying in the normal manner using the RNAV system for course guidance switches 74, 82, 106, and 114 are all placed in the "en route" position (This is advantageously accomplished by mechanically coupling all four switches together.) Under this condition, the #1 VOR receiver provides the $\phi_A$ signal to RNAV computer 86, and DME receiver 78 is tuned to the frequency determined by #1 frequency selector unit 66. At the same time, the left right RNAV steering signals are provided from the RNAV unit through switch 106 to the left side. indicator 110. The #2 indicator, fed by switch 114 is not in use at this time since no signal is provided to the "en route" contact of the switch. Likewise, the ILS, which is used only for approach guidance is not in use at this time.

For ILS operation, switches 74, 82, 106 and 114 are set to the "ARM" position. Here, the #2 VOR receiver 64 provides the $\phi_A$ signal to the RNAV computer 86 through the "ARM" contact of switch 82, and the #2 frequency selector tunes the DME through the "ARM" contact of switch 74. This again assures that the DME and the #2 VOR receiver are receiving range and bearing information from the same VORTAC.

At the same time, the localizer converter 80, which receives the output of VOR receiver 62 is coupled through the "ARM" contact of switch 106 and provides the localizer steering information to the left side indicator 110. Range and bearing to a selected waypoint are displayed by digital display unit 116.

For a front course ILS approach, the waypoints are advantageously set at the outer and middle markers. Assuming that waypoint unit 88 is set to the outer marker address and waypoint unit 90 is set to the middle marker address, when switches 74, 82, 106, and 114 are set to the "ARM" position (at the begining of an ILS approach,) switches 100 and 102 are set in the #1 positions. These switches are also mechanically coupled for convenience. The RNAV computer is therefore supplied with the address of the outer marker, and while ILS is providing the customary steering information, bearing and range to the outer marker is available on display 116. The pilot is aware of his distance to the marker as he approaches the localizer. Without the range monitor, only the marker beacon itself, and the resulting audible signal, is available to announce passage of the marker.

When the outer marker is passed, switches 100 and 102 are placed in the #2 position. Now, the selected waypoint is the middle marker, and the pilot is provided a useful indication of his distance to the runway. Absent a terminal DME or a ground control radar, no such approach distance information would be available to the pilot without the range monitor.

For a back course approach, operation is the same as described above, except the waypoints are selected at the final approach fix and at the end of the runway. Without the range monitor, the only distance information available would be on the # 2 indicator from receiver 64 through the "ARM" contact of switch 114. To accomplish this, the course selector on the # 2 indicator is set to the radial from the VORTAC by which the FAF is defined. If the aircraft is on the localizer when the left-right needle of the # 2 indicator is centered, then the pilot knows he has crossed the FAF. This is obviously far less convenient than the constant range and bearing information available from the RNAV since the information does not depend on the aircraft actually being on the localizer, and does not require observation of two separate instruments.

SUMMARY

In the above, there has been described an improved arrangement for utilizing an RNAV system during ILS approaches to give the pilot added distance and bearing information frequently unavailable at general aviation facilities. While the system has been described in the context of certain RNAV systems developed by applicant's assignee, it should be understood that the invention may be utilized in other RNAV system as well, and may be implemented with other structural configurations. The above description is therefore only exemplary, and the scope of the invention defined by the appended claims.

I claim:

1. In an aircraft navigation system having first and second NAV receivers, at least one DME receiver, a localizer converter, a left-right steering display, and an RNAV computer, means to select reception of range and bearing to Waypoint information signals to a Waypoint station and means responsive to the range and bearing to Waypoint information signals to display said range and/or bearing of the aircraft to the selected Waypoint, the improvement comprising first switch means for selectively coupling said first or second receiver to the RNAV computer; means coupling said DME receiver to said RNAV computer; means coupling said first NAV receiver to said localizer converter; and second switch means simultaneously operable with said first switch means for selectively coupling the output of said RNAV computer or said localizer converter to said steering display, said first NAV receiver being coupled to said RNAV computer when said RNAV computer output is connected to said steering indicator and said second NAV receiver being connected to said RNAV computer when said localizer converter output is connected to said steering display, and wherein said range and bearing to Waypoint is displayed when said second NAV receiver is connected to said RNAV.

2. Apparatus as defined in claim 1 further including first and second means for tuning the first and second NAV receivers; and third switch means simultaneously operable with said first and second switch means for selectively coupling said first and second tuning means to said DME receiver, said first tuning means being coupled to said DME receiver when said first NAV receiver is coupled to said RNAV computer, and said second tuning means being coupled to said DME receiver when said second NAV receiver is coupled to said RNAV computer.

3. Apparatus as defined in claim 1 further including a bearing indicator, and fourth switching means for connecting said second NAV receiver to said bearing indicator when the second NAV receiver is connected to said RNAV computer.

4. In the aircraft navigation system of claim 1 wherein said first and second NAV receivers are VOR receivers.

5. In the aircraft navigation system of claim 1 wherein said first and second NAV receivers are TACAN receivers.

* * * * *

Disclaimer 4,061,297.—*George B. Foster*, Worthington, Ohio. APPROACH RANGE MONITOR. Patent dated Dec. 6, 1977. Disclaimer filed Mar. 22, 1978, by the assignee, *Air Data Corporation*.

The term subsequent to Mar. 6, 1994 has been disclaimed.

[*Official Gazette June 27, 1978.*]